United States Patent Office 2,883,341
Patented Apr. 21, 1959

2,883,341

LITHIUM BASE GREASE MODIFIED WITH LITHIUM OR ALUMINUM 2-ETHYL HEXANOATE

John R. Allison, Whittier, Calif., assignor to Leffingwell Chemical Company, Whittier, Calif., a corporation of California No Drawing. Application January 16, 1956
Serial No. 559,122

6 Claims. (Cl. 252—36)

This invention has to do generally with lithium base greases composed of lithium soap and an appropriate lubricating oil, and is directed particularly to improvements in such greases rendering them resistant to "bleeding," i.e. exudation of mineral oil at lower temperatures.

The so-called lithium greases are well known to have certain characteristic properties rendering them desirable for various uses. I have observed however that at lowered temperatures these greases will tend to bleed, the extent of this effect and the temprature of its occurrence being variable and dependent upon such factors as the grade or viscosity of the lubricating oil and the proportions in which the oil may be blended with the lithium soap.

My primary object is to reduce or eliminate in lithium grease, bleeding by compounding with the oil a soap component which is principally lithium soap, and a second soap which has the unique property and relation to the lithium grease structure of markedly reducing its low temperature bleeding tendencies.

First, in general reference to the lithium soap component of the present grease, the invention contemplates the use of any suitable lithium soap or mixtures thereof, such as the fatty acid or 14 to 22 carbon atom soaps, e.g. the lithium soaps of stearic, oleic, palmitic and myristic acids. Lithium stearate is perferred. In themselves, the lithium soaps are formed by reaction of the fatty acid with a water soluble lithium salt or compound such as the chloride, sulfate, hydroxide or carbonate.

The second soap component employed to reduce the normal bleeding tendencies of a straight lithium grease is either or mixtures of the lithium and aluminum salts of octoic acid, known also as 2-ethyl hexanoic acid, the salts being termed hexanoates or octoates. While the lithium or aluminum hexanoates are used as hereafter discussed primarily to minimize bleeding tendencies of the compounded grease, they have been found to further benefit the grease in such respects as rendering it more stable (e.g. as compared with naphthenates) to heat and therefore less corrosive at higher temperatures, and imparting to the grease greater oxidation resistance.

Generally considered, the lithium fatty acid soap and the lithium or aluminum hexanoate may be formed and ultimately blended with lubricating oil by any suitable procedures. These soaps may be formed independently and then mixed or blended, or they may be produced by coprecipitation methods whereby a mixture of a fatty acid or water soluble alkali metal fatty acid soap, and 2-ethyl hexanoic acid or alkali metal hexanoate is reacted with the chloride, sulfate hydroxide or carbonate of lithium or aluminum to precipitate together the lithium fatty acid soap and the lithium or aluminum hexanoate. Sequential precipitation may be employed by starting with or first precipitating the lithium fatty acid soap, and then precipitating on the latter the lithium or aluminum hexanoate. In making of greases, the precipitated and dried soaps may be added to an appropriate lubricating oil, or the soaps may be precipitated in situ, i. e. in the oil, and all moisture then driven out of the grease mixtures.

The relative proportions of the lithium fatty acid soap and lithium or aluminum hexanoate may vary depending upon specific properties desired in different grease compositions. But in general, accomplishment of my objective of reducing the bleeding tendencies of the product, may be achieved by using the hexanoate in a proportion of from ½% to 20% of the combined hexanoate and lithium fatty acid soap.

The following examples are illustrative of typical grease formulations compounded in accordance with the invention:

*Example 1*

About 175 pounds of 2-ethyl hexoic acid and 1585 pounds of 60 titer stearic acid together are reacted with water solution of 275 pounds of lithium carbonate, at a temperature of about 225° F. to form a mixture of lithium stearate and lithium 2-ethyl hexoic acid soaps. The latter are separated from the aqueous phase, dried, and blended with mineral oil in the proportion of 20 pounds of the lithium soaps to 80 pounds of the mineral oil to form a bleed resistant grease.

*Example 2*

A grease is prepared as in Example 1, except that 178 pounds of lithium hydroxide is used, instead of the lithium carbonate.

*Example 3*

800 pounds of 2-ethyl hexoic acid is saponified at 160° F. with 245 pounds of caustic soda in aqueous solution. The resulting sodium hexanoate is precipitated by adding to the solution of 620 pounds of aluminum sulfate, the precipitation being at 145° F. The remaining aluminum hexanoate is separated or filtered and dried, and 8 pounds is blended uniformly with 92 pounds of lithium stearate. The blended aluminum hexanoate and lithium stearate are blended with 80 pounds of mineral oil in the proportion of 20 pounds of the mixed soaps to 80 pounds of the mineral oil to form a grease.

Relative to the comparative bleed resistant characteristics of greases compounded in accordance with the invention, and employing the well known AN-Aeronautical specification tests for low temperature greases, 10 grams of conventional lithium stearate greases held in 60 mesh cone at 100° C. for 50 hours, showed from 6 to 7% oil bleed, whereas greases compounded the same but with the added lithium hexanoate, showed by the same test oil loss of only 3 to 3½%, where aluminum hexanoate was used instead of lithium hexanoate, the oil out was slightly higher, being between about 3½ to 4%.

I claim:

1. A bleed-resistant lubricating grease comprising lubricating oil and a soap component consisting essentially of a lithium soap and a second soap of the group consisting of lithium 2-ethyl hexanoate and aluminum 2-ethyl hexanoate, said second soap constituting between ½% to 20% of said soap component, said second soap acting to reduce substantially the low temperature bleeding tendencies of the grease as compared with those of a corresponding grease lacking said second soap.

2. A bleed-resistant lubricating grease comprising lubricating oil and a soap component consisting essentially of lithium stearate and a second soap of the group consisting of lithium 2-ethyl hexanoate and aluminum 2-ethyl hexanoate, said second soap constituting between ½% to 20% of said soap component, said second soap acting to reduce substantially the low temperature bleeding tendencies of the grease as compared with those of a corresponding grease lacking said second soap.

3. A bleed-resistant lubricating grease comprising lubricating oil and a soap component consisting essentially of a lithium soap and lithium 2-ethyl hexanoate as a second soap, said hexanoate constituting between about ½% to 20% of said soap component, said second soap acting to reduce substantially the low temperature bleeding tendencies of the grease as compared with those of a corresponding grease lacking said second soap.

4. A bleed-resistant lubricating grease comprising lubricating oil and a soap component consisting essentially of a lithium soap and aluminum 2-ethyl hexanoate as a second soap, said hexanoate constituting between about ½% to 20% of said soap component, said second soap acting to reduce substantially the low temperature bleeding tendencies of the grease as compared with those of a corresponding grease lacking said second soap.

5. A bleed-resistant lubricating grease comprising lubricating oil and a soap component consisting essentially of lithium stearate and lithium 2-ethyl hexanoate as a second soap, said hexanoate constituting between about ½% to 20% of said soap component, said second soap acting to reduce substantially the low temperature bleeding tendencies of the grease as compared with those of a corresponding grease lacking said second soap.

6. A bleed-resistant lubricating grease comprising lubricating oil and a soap component consisting essentially of lithium stearate and aluminum 2-ethyl hexanoate as a second soap, said hexanoate constituting between about ½% to 20% of said soap component, said second soap acting to reduce substantially the low temperature bleeding tendencies of the grease as compared with those of a corresponding grease lacking said second soap.

References Cited in the file of this patent

UNITED STATES PATENTS

| | | |
|---|---|---|
| 2,274,675 | Earle | Mar. 3, 1942 |
| 2,606,153 | Holdstock | Aug. 5, 1952 |
| 2,628,195 | Allison et al. | Feb. 10, 1953 |
| 2,628,202 | Allison et al. | Feb. 10, 1953 |
| 2,760,936 | Baker | Aug. 28, 1956 |